(12) United States Patent
Cordaro et al.

(10) Patent No.: US 12,727,719 B2
(45) Date of Patent: Sep. 8, 2026

(54) VARIABLE SPEED MIXING IN A STAND MIXER APPLIANCE

(71) Applicant: Haier US Appliance Solutions, Inc., Wilmington, DE (US)

(72) Inventors: Rocco Cordaro, Louisville, KY (US); Andrew Combs, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 366 days.

(21) Appl. No.: 18/533,626

(22) Filed: Dec. 8, 2023

(65) Prior Publication Data

US 2025/0185851 A1 Jun. 12, 2025

(51) Int. Cl.
*A47J 43/08* (2006.01)
*A47J 43/044* (2006.01)

(52) U.S. Cl.
CPC .......... *A47J 43/082* (2013.01); *A47J 43/044* (2013.01); *A47J 2043/04454* (2013.01)

(58) Field of Classification Search
CPC .............................. B01F 35/212; A47J 43/082
See application file for complete search history.

(56) References Cited

U.S. PATENT DOCUMENTS

| | | | | |
|---|---|---|---|---|
| 2,241,528 | A | 5/1941 | Alfred et al. | |
| 2010/0079092 | A1 | 4/2010 | Carpenter et al. | |
| 2013/0033957 | A1 | 2/2013 | Huang | |
| 2013/0340456 | A1* | 12/2013 | Hoare .................. | B01F 35/212 62/126 |
| 2018/0271322 | A1* | 9/2018 | Thai ................. | A47J 27/21083 |

FOREIGN PATENT DOCUMENTS

| | | | |
|---|---|---|---|
| DE | 20119285 | U1 | 2/2002 |
| JP | 2023089464 | A | 6/2023 |

* cited by examiner

*Primary Examiner* — Elizabeth Insler
(74) *Attorney, Agent, or Firm* — Dority & Manning, P.A.

(57) ABSTRACT

A method includes operating a mixing cycle of a stand mixer. The mixing cycle includes rotating a mixing shaft at a first speed for a first period of time, rotating, when the first period of time elapses, the mixing shaft at a second speed, measuring a torque of a motor while rotating the mixing shaft at the second speed, and then rotating the mixing shaft at the first speed for a second period of time. The method further includes terminating the mixing cycle in response to one of the torque of the motor and elapsing the second period of time.

20 Claims, 3 Drawing Sheets

VARIABLE SPEED MIXING IN A STAND MIXER APPLIANCE

FIELD OF THE INVENTION

The present subject matter relates generally to stand mixers and methods of operating such mixers, and more particularly to systems and methods for variable speed mixing in stand mixer appliances.

BACKGROUND OF THE INVENTION

Stand mixers are generally used for performing mixing, churning, or kneading involved in food preparation. Typically, stand mixers include a motor configured to provide torque to one or more driveshafts. Users may connect various utensils to the one or more driveshafts, including whisks, spatulas, or the like. Operating a stand mixer is frequently a manual process, which involves the user actively monitoring the mixing process. Thus, during the mixing process, a user is positioned close to the mixer in order to monitor the content doneness and to turn-off the stand mixer when the desired doneness is reached. However, users frequently attend to multiple activities when baking or cooking, and ingredients that have reached the desired doneness may sit in the stand mixer for some time before the user returns to the stand mixer. As such, ingredients may settle out of the mixture and become unincorporated in the stand mixer. For a user, having to re-mix the ingredients can be tedious and inconvenient, and may lead to overworking the ingredients.

Accordingly, a stand mixer configured to prevent the settling of ingredients, as well as avoid overworking ingredients would be advantageous.

BRIEF DESCRIPTION OF THE INVENTION

Aspects and advantages of the invention will be set forth in part in the following description, or may be apparent from the description, or may be learned through practice of the invention.

In one example embodiment is a method for operating a stand mixer. The stand mixer includes a housing, a motor disposed in the housing, a mixing shaft operably coupled to the motor, and a controller. The method includes operating a mixing cycle of the stand mixer. The mixing cycle includes rotating, by the motor, the mixing shaft at a first speed for a first period of time, rotating, by the motor, when the first period of time elapses, the mixing shaft at a second speed, measuring, by the controller, a torque of the motor while rotating the mixing shaft at the second speed, and rotating, by the motor, the mixing shaft at the first speed for a second period of time. The method further includes terminating the mixing cycle in response to one of the torque of the motor and elapsing the second period of time.

In another example embodiment, a stand mixer includes a housing, a motor disposed in the housing, a mixing shaft operably coupled to the motor, and a controller. The controller is configured to operate a mixing cycle of the stand mixer. The mixing cycle includes rotating, by the motor, the mixing shaft at a first speed for a first period of time, rotating, by the motor, when the first period of time elapses, the mixing shaft at a second speed, measuring, by the controller, a torque of the motor while rotating the mixing shaft at the second speed, and rotating, by the motor, the mixing shaft at the first speed for a second period of time. The controller is further configured to terminate the mixing cycle in response to one of the torque of the motor and elapsing the second period of time.

In another example embodiment is a method for operating a stand mixer. The method includes operating a mixing cycle of the stand mixer. The mixing cycle includes rotating a mixing shaft at a first speed for a first period of time, rotating, when the first period of time elapses, the mixing shaft at a second speed, measuring a torque of a motor while rotating the mixing shaft at the second speed, and rotating the mixing shaft at the first speed for a second period of time. The method further includes terminating the mixing cycle in response to one of the torque of the motor and elapsing the second period of time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
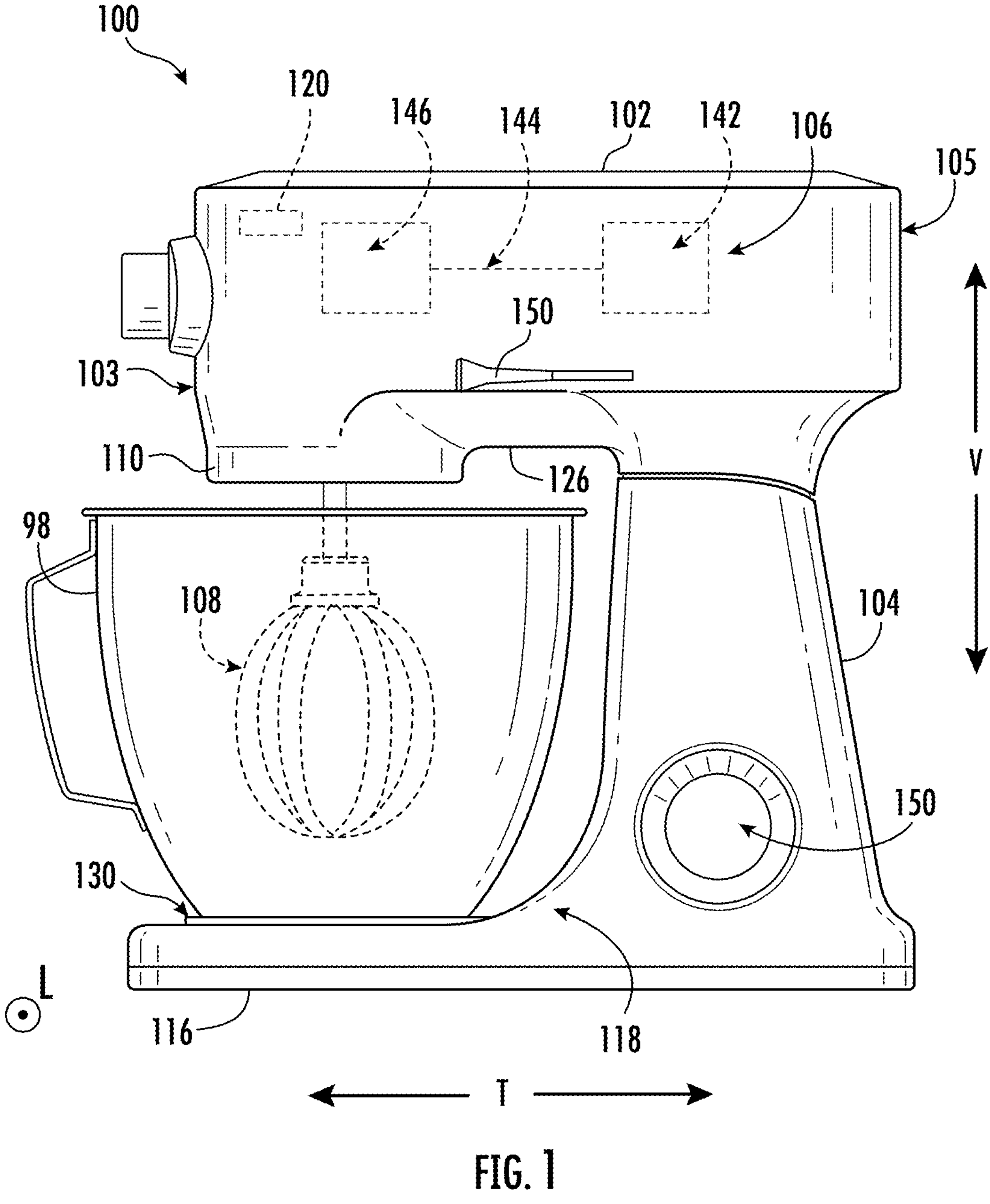
FIG. 1 provides a side view of an example stand mixer with a bowl according to example embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related.

The terms "coupled," "fixed," "attached to," and the like refer to both direct coupling, fixing, or attaching, as well as indirect coupling, fixing, or attaching through one or more intermediate components or features, unless otherwise specified herein.

The present invention advantageously provides a mixer appliance with a secure mixing attachment coupling to a mixing shaft of the mixer appliance. This secure coupling may allow the mixer to rotate the shaft with the secured mixing attachment in clockwise and counterclockwise motions. In some embodiments, the ability to rotate mixing attachments in more than one direction may allow for faster, more complete, or more preferred mixing, blending, or other mechanical manipulation of articles mixed or otherwise manipulated by the mixer appliance.

The figures depict an exemplary stand mixer appliance 100 that may be configured in accordance with various aspects of the present disclosure. It should be appreciated that the invention is not limited to any particular style, size, model, or shape for stand mixer appliance 100. The exemplary embodiment in FIG. 1 is for illustrative purposes only. For example, appliance 100 may have different shapes and appearance for one or more parts, different motor and gear configurations, and other differences while remaining within the scope of the claimed subject matter.

Figure 2:
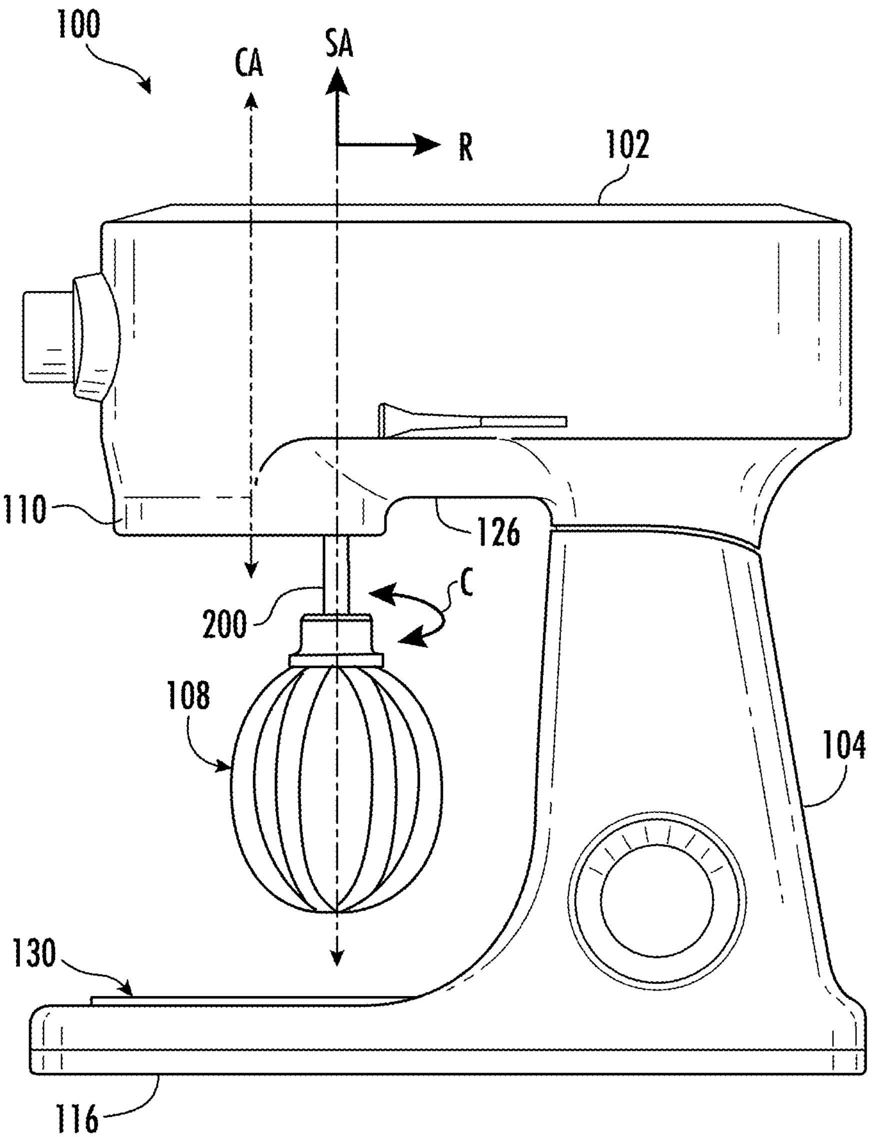
FIG. 2 provides a side view of the stand mixer with a mixing attachment according to example embodiments of the present disclosure.

With reference for FIGS. 1 and 2, for the particular embodiment shown, a stand mixer appliance 100 includes a housing, or a head 102, and a base 104 with a casing 106 surrounding head 102. Stand mixer 100 may extend between head 102 and base 104 in a vertical direction V, across head 102 in a lateral direction L, and from a front 103 to a back 105 in a transverse direction T. The vertical direction V, lateral direction L, and transverse direction T are perpendicular to one another.

Head 102 may be pivotally mounted to base 104 and extends transversely between front 103 and back 105 of stand mixer appliance 100 when in the mixing position shown in FIG. 1. In some embodiments, head 102 may be non-pivotably attached to base 104. Other configurations may be used where head 102 may allow for access to a bowl 98 or to a removable mixing attachment 108, as otherwise understood. For this embodiment, base 104 includes upright support 112 and a horizontal base member 116. As shown, upright support 112 extends vertically from horizontal base member 116 and horizontal base member 116 extends transversely in front of upright support 112.

Horizontal base member 116 includes a bowl seat 130 that may be rotatable about a vertical axis. In some embodiments, bowl seat 130 may be concave, grooved, or otherwise shaped to accept bowl 98. In some embodiments, support arms (not shown) or equivalent support structures may be used to hold bowl 98, as would be understood. Other shapes and constructions may be used for bowl seat 130 as well.

Head 102 includes an attachment support 110. A motor 142 is disposed within the housing, i.e., head 102, and enclosed by casing 106. Attachment support 110 is located on a lower portion or underside 126 of head 102 and forward of upright support 112 along transverse direction T. A mixing shaft 200 extends from attachment support 110. Removable mixing attachment 108 removably attaches to shaft 200.

Drivetrain 144 connects motor 142 with one or more gears 146 for causing rotation of attachment 108 or mixing shaft 200, e.g., mixing shaft 200 may be operably coupled to motor 142. Gears 146 may allow for selection by the user of different rotating speeds for attachment 108. In general, mixing attachment 108 may be coupled to shaft 200 prior to rotation of shaft 200 by motor 142.

Stand mixer 100 may include one or more controls 150 for operations such as selectively powering motor 142, choosing the speed of rotation for attachments 108, locking position of head 102 relative to base 104 during mixing, or other features. In some embodiments, controls 150 may include a rotational direction operation selection, allowing a user to select the direction of rotation of the mixing shaft 200. For example, controls 150 may include a lever and a dial. The lever may be pushed or pulled in order to lock or unlock the position of head 102 relative to base 104. The dial may be rotated to select the speed of rotation for attachments 108 and/or may include the rotational direction operation selection as described above.

In certain embodiments, attachment support 110 may accept more than one attachment 108. Various types of attachments 108 may be used including e.g., whisks, paddles, dough hooks, beaters, and others for purposes of mixing articles or mechanically manipulating articles within bowl 98 or other containers supported by base 104. During use, attachment support 110 with mixing shaft 200 may rotate attachment 108 in a circular or planetary fashion. Spinning in a planetary fashion, as used herein, includes spinning an object (e.g., shaft 200) about a first axis and revolving the object about a second axis, the object offset from the second axis. For example, shaft 200 may spin about a shaft axis SA, and revolve about a central axis CA, shaft 200 offset from central axis CA to generate movement in a planetary rotation. Shaft axis SA may also be offset from central axis CA. In some embodiments, motor 142 may be disposed within base 104, including within upright support 112.

As shown in FIG. 2, mixing shaft 200 may rotate within attachment support 110. Mixing attachment 108 and mixing shaft 200 are rotatable by motor 142 in planetary rotation. Mixing shaft may define the shaft axis SA, with a radial direction R extending therefrom perpendicular to the shaft axis SA, and a circumferential direction C extending around axial direction (as shown in FIG. 4). Mixing shaft 200 may rotate around central axis CA, wherein mixing shaft 200 is rotating in circumferential direction C. Additionally or alternatively, motor 142 may be operable to selectively rotate mixing attachment 108 in a clockwise direction or a counterclockwise direction in circumferential direction C around shaft axis SA. Thus, mixing shaft 200 may be reversible, or moveable in either direction during use. Attachment of mixing attachment 108 to shaft 200 allows for motion in both directions, clockwise and counterclockwise, by motor 142. In other words, motor 142 can rotate mixing attachment 108 and/or shaft 200 in a clockwise direction and can switch and rotate mixing attachment 108 or shaft 200 in a counterclockwise direction. Such movement may be directed by a user (e.g., by use of controls 150) or may be directed independent of a user, e.g., by using a timer, by using a controller, described hereinbelow, in operable communication with motor 142, or as otherwise understood.

In general, stand mixer 100 may include a controller 120 provided within casing 106. In some embodiments, controller 120 may be located within head 102 of casing 106, and various other locations for the controller 120 are possible as well. For instance, controller 120 may be a microcontroller, as would be understood, including one or more processing devices, memory devices, or controllers. Controller 120 may include a plurality of electrical components configured to permit operation of stand mixer 100 and various components therein (e.g., motor 142). For instance, controller 120 may include a printed circuit board (PCB) with various components coupled thereto, as would be understood by those of ordinary skill in the art.

As used herein, the terms "control board," "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 120 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 120 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 120 may be operable to execute programming instructions or micro-control code associated with an operating cycle of stand mixer 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 120 as disclosed herein is capable of and may be operable to perform any methods, method steps, or portions of methods as disclosed herein. For example, in some embodiments, methods disclosed herein may be embodied in programming instructions stored in the memory and executed by controller 120. According to still other example embodiments, one or more of the controls 150 may include one or more microprocessors and/or one or more memory devices. Accordingly, certain components of stand mixer 100 may be controlled directly from controls 150.

The memory devices may also store data that can be retrieved, manipulated, created, or stored by the one or more processors or portions of controller 120. The data can include, for instance, data to facilitate performance of methods described herein. The data can be stored locally (e.g., on controller 120) in one or more databases and/or may be split up so that the data is stored in multiple locations. In addition, or alternatively, the one or more database(s) can be connected to a remote user interface (not shown) through any suitable network(s), such as through a high bandwidth local area network (LAN) or wide area network (WAN). In this regard, for example, controller 120 may further include a communication module or interface that may be used to communicate with one or more other component(s) of stand mixer 100, controller 120, an external appliance controller, an external device, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

In general, controller 120 may be configured to perform a mixing cycle, wherein stand mixer 100 may be operated to mix food contents, such as food contents in bowl 98. Additionally, controller 120 may configured to receive a command indicative of initiating the mixing cycle. For example, the command indicative of the mixing cycle may include one or more of receiving a user input indicative of starting the mixing operation, e.g., user manipulation of controls 150. In some example embodiments, the mixing cycle may generally operate at a first speed for a first period of time. For example, the first speed may be chosen, e.g., by the user via controls 150, or may be automatically selected by controller 120 in order to achieve desired results of the mixing cycle. Furthermore, the mixing cycle may generally operate at a second speed after the first period of time elapses, before returning to the first speed for a second period of time, as will be further described hereinbelow.

In particular, during the mixing cycle, controller 120 may be configured to rotate, by motor 142, mixing shaft 200 (and thereby attachment 108) at the first speed for the first period of time. For example, the mixing cycle operates at the first speed, thereby mixing food contents, such as food contents in bowl 98, for the duration of the first period of time. After the first period of time elapses, controller 120 may be configured to rotate, by motor 142, mixing shaft 200 (and thereby attachment 108) at the second speed. In the present example embodiment, the second speed of the mixing cycle may be less than the first speed of the mixing cycle. In particular, while mixing shaft 200 is rotating at the second speed, controller 120 may be configured to measure a torque of the motor. Particularly, the threshold torque of the motor may be specific to the food contents being mixed, e.g., a threshold torque reading may be specific to a recipe/instruction of the food contents being mixed. As such, measuring the torque of the motor may include controller 120 recording a baseline torque value for comparison with measurements while the motor operates to mix food contents, wherein comparing the torque of the motor with the baseline torque value may aid in determining an ingredient state of the food contents being mixed.

Moreover, controller 120 may be configured to rotate, by motor 142, mixing shaft 200 (and thereby attachment 108) at the first speed for the second period of time. For example, the mixing cycle may operate at the first speed, thereby mixing food contents, such as food contents in bowl 98, for the duration of the second period of time. Additionally, the first period of time and the second period of time may be any amount of time between one second and three hundred and sixty seconds, e.g., the first period of time and the second period of time may be the same time or may be different times. For example, the first period of time and the second period of time may be specific to the food contents being mixed or recipe being performed. In general, controller 120 may be configured to terminate the mixing cycle in response to one of the torque of the motor and elapsing the second period of time. For example, when terminating the cycle based upon the torque of the motor, the torque of the motor may have reached a threshold value or reached a ratio of the current torque to the baseline torque or reached a difference between the current torque and the baseline torque. In other example embodiments, different torque threshold values may indicate the ingredient state of the food contents is desirable. In the present example embodiment, in general, either the torque of the motor may indicate the ingredient state of the food contents is desirable, or the second period of time may elapse, advantageously preventing over mixing of the food contents.

As stated above, the second speed of the mixing cycle may be less than the first speed of the mixing cycle. In general, the first speed may include a range of speeds of the motor. For example, the first speed may be configurable to increase, or decrease, between or through the range of speeds during the first period of time and the second period of time. In general, the second speed of the mixing cycle may include a constant speed. For example, the second speed of the mixing cycle may be a constant speed that is slower than the first speed, such as when the first speed includes a range of speeds the second speed may be less than the lower limit of such range of speeds. The slower speed of the second speed may advantageously increase the accuracy of the torque measurement when measuring the torque of the motor.

As one skilled in the art will appreciate, the above described embodiments are used only for the purpose of explanation. Modifications and variations may be applied, other configurations may be used, and the resulting configurations may remain within the scope of the invention. For example, stand mixer 100 is provided by way of example only and aspects of the present subject matter may be incorporated into any other suitable stand mixer appliance.

Figure 3:
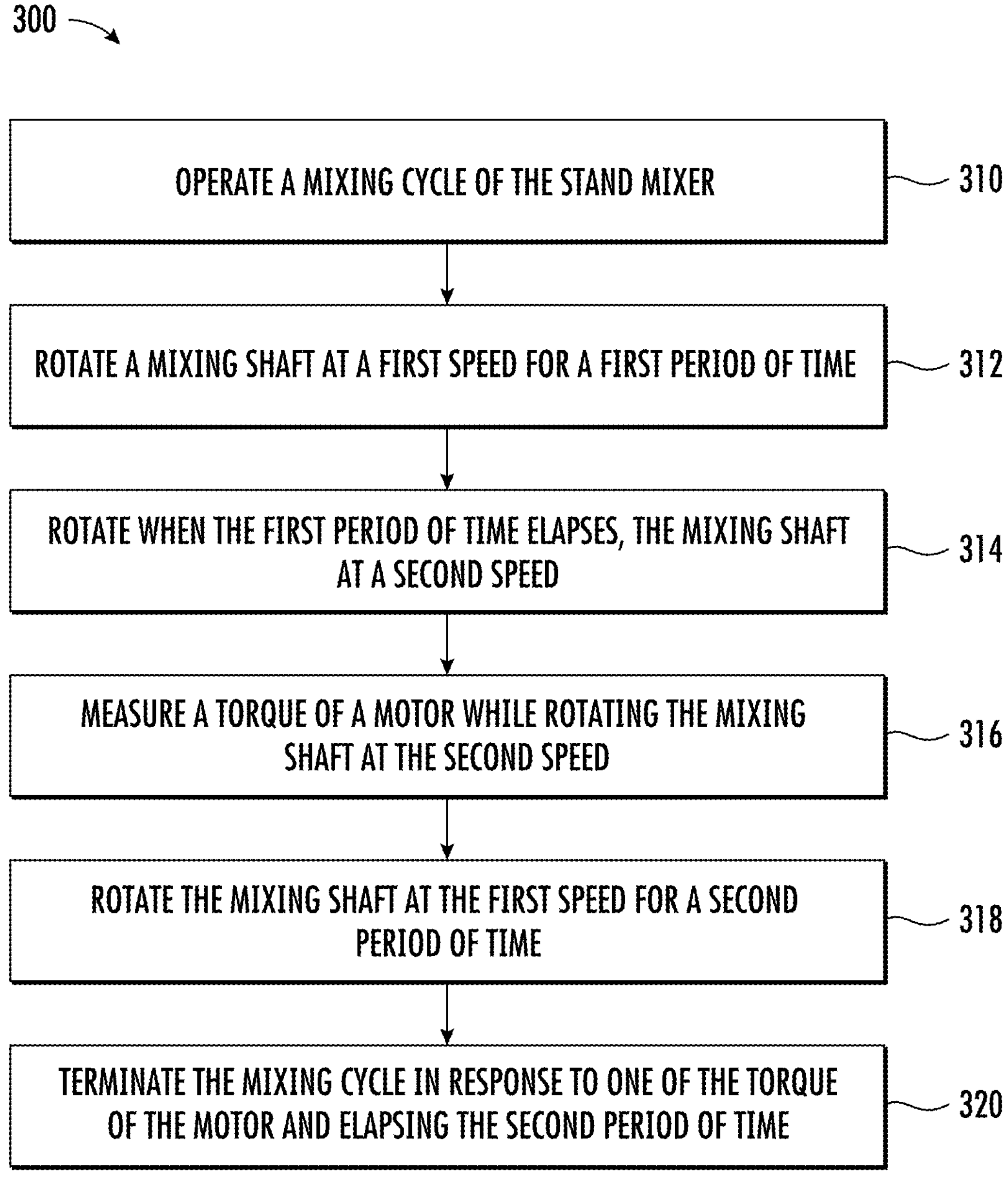
FIG. 3 illustrates a flow diagram of an example method of operating a stand mixer according to aspects of the present disclosure.

Referring now to FIG. 3, a flow diagram of one embodiment of a method 300 of operating a stand mixer, such as stand mixer 100, is illustrated in accordance with aspects of the present subject matter. In general, method 300 will be described herein with reference to the embodiments of stand mixer 100 and related elements described above with reference to FIGS. 1 and 2. However, it should be appreciated by those of ordinary skill in the art that the disclosed method 300 may generally be utilized in association with apparatuses and systems having any other suitable configuration. In addition, although FIG. 3 depicts steps performed in a particular order for purposes of illustration and discussion, the method discussed herein is not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 3, at (310), method 300 may generally include operating the mixing cycle of the stand mixer 100. At (312), the mixing cycle of method 300 may generally include the motor rotating the mixing shaft at the first speed of the motor for the first period of time. At (314), the mixing cycle of method 300 may generally include, when the first period of time elapses, the motor rotating the mixing shaft at the second speed. At (316), the mixing cycle of method 300 may generally include the controller measuring the torque of the motor while the motor is rotating the mixing shaft at the second speed. At (318), the mixing cycle of method 300 may generally include the motor rotating the mixing shaft at the first speed for a second period of time.

At (320), the mixing cycle of method 300 may generally include the controller terminating the mixing cycle in response to one of the torque of the motor and elapsing the second period of time. As stated above, the torque of the motor may indicate that the ingredient state of the food contents is desirable, or the second period of time may elapse, advantageously preventing over mixing of the food contents.

Additionally, method 300 may include controller 120 receiving a command indicative of initiating the mixing cycle. For example, the command indicative of the mixing cycle may include receiving a user input indicative of starting the mixing operation, e.g., user manipulation of controls 150.

In some example embodiment, method 300 may further include measuring the torque of the motor, which may include recording a baseline torque value for comparison with measurements while the motor operates to mix food contents. Furthermore, method 300 may include comparing the torque of the motor with the baseline torque value and determining an ingredient state, as described above.

Additionally, in some example embodiments, method 300 may include the mixing cycle operating at the first speed, mixing food contents for the duration of the first period of time, and, after the first period of time elapses, operating the mixing cycle at the second speed. As stated above, the second speed of the mixing cycle may be less than the first speed of the mixing cycle.

Moreover, in some example embodiments, the first speed of the motor in method 300 may include a range of speeds of the motor. For example, the first speed may be configurable to increase, or decrease, between or through the range of speeds during the first period of time and the second period of time. In general, the second speed of the mixing cycle may include a constant speed. For example, the second speed of the mixing cycle may be a constant speed that is slower than the first speed, such as when the first speed includes a range of speeds the second speed may be less than the lower limit of such range of speeds.

As may be seen from the above, a stand mixer may automatically change/vary rotational speed throughout a mixing cycle of a recipe in order to evaluate torque and a state of a mixture. Based on the evaluation, the rotational speed may be increased or decreased according to the desired outcome, e.g., the recipe requirements. The stand mixer may automatically adjust the speed during the mixing cycle to a slower speed to perform data processing and then return to the other speed for the mixing operation. In other words, the stand mixer may automatically change speeds multiple times at various speeds and various times to reach the desired outcome.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a stand mixer, the stand mixer comprising a housing, a motor disposed in the housing, a mixing shaft operably coupled to the motor, and a controller, the method comprising:

operating a mixing cycle of the stand mixer, the mixing cycle comprising:

rotating, by the motor, the mixing shaft at a first speed for a first period of time;

rotating, by the motor, when the first period of time elapses, the mixing shaft at a second speed;

measuring, by the controller, a torque of the motor while rotating the mixing shaft at the second speed; and rotating, by the motor, the mixing shaft at the first speed for a second period of time; and terminating the mixing cycle in response to one of the torque of the motor and elapsing the second period of time.

2. The method of claim 1, wherein measuring the torque of the motor comprises recording a baseline torque value for comparison with measurements while the motor operates to mix food contents.

3. The method of claim 2, further comprising comparing the torque of the motor with the baseline torque value and determining an ingredient state.

4. The method of claim 1, wherein the mixing cycle operates at the first speed, thereby mixing food contents for the duration of the first period of time, wherein after the first period of time elapses, the mixing cycle operates at the second speed, the second speed of the mixing cycle less than the first speed of the mixing cycle.

5. The method of claim 4, wherein the first speed comprises a range of speeds of the motor, the first speed configurable to increase or decrease between the range of speeds during the first period of time and the second period of time.

6. The method of claim 4, wherein the second speed of the mixing cycle comprises a constant speed.

7. The method of claim 1, further comprising receiving a command indicative of initiating the mixing cycle.

8. A stand mixer, comprising:

a housing;

a motor disposed in the housing;

a mixing shaft operably coupled to the motor; and a controller, the controller configured to:

operate a mixing cycle of the stand mixer, the mixing cycle comprising:

rotating, by the motor, the mixing shaft at a first speed for a first period of time;

rotating, by the motor, when the first period of time elapses, the mixing shaft at a second speed;

measuring, by the controller, a torque of the motor while rotating the mixing shaft at the second speed; and rotating, by the motor, the mixing shaft at the first speed for a second period of time; and terminate the mixing cycle in response to one of the torque of the motor and elapsing the second period of time.

9. The stand mixer of claim 8, wherein measuring the torque of the motor comprises the controller further configured to record a baseline torque value for comparison with measurements while the motor operates to mix food contents.

10. The stand mixer of claim 9, wherein the controller is further configured to compare the torque of the motor with the baseline torque value and determine an ingredient state.

11. The stand mixer of claim 8, wherein the mixing cycle operates at the first speed, thereby mixing food contents for the duration of the first period of time, wherein after the first period of time elapses, the mixing cycle operates at the second speed, the second speed of the mixing cycle less than the first speed of the mixing cycle.

12. The stand mixer of claim 11, wherein the first speed comprises a range of speeds of the motor, the first speed configurable to increase or decrease between the range of speeds during the first period of time and the second period of time.

13. The stand mixer of claim 11, wherein the second speed of the mixing cycle comprises a constant speed.

14. The stand mixer of claim 8, wherein the controller is further configured to receive a command indicative of initiating the mixing cycle.

15. A method for operating a stand mixer, the method comprising:

operating a mixing cycle of the stand mixer, the mixing cycle comprising:

rotating a mixing shaft at a first speed for a first period of time;

rotating, when the first period of time elapses, the mixing shaft at a second speed;

measuring a torque of a motor while rotating the mixing shaft at the second speed; and rotating the mixing shaft at the first speed for a second period of time; and terminating the mixing cycle in response to one of the torque of the motor and elapsing the second period of time.

16. The method of claim 15, wherein measuring the torque of the motor comprises recording a baseline torque value for comparison with measurements while the motor operates to mix food contents.

17. The method of claim 16, further comprising comparing the torque of the motor with the baseline torque value and determining an ingredient state.

18. The method of claim 15, wherein the mixing cycle operates at the first speed, thereby mixing food contents for the duration of the first period of time, wherein after the first period of time elapses, the mixing cycle operates at the second speed, the second speed of the mixing cycle less than the first speed of the mixing cycle.

19. The method of claim 18, wherein the first speed comprises a range of speeds of the motor, the first speed configurable to increase or decrease between the range of speeds during the first period of time and the second period of time.

20. The method of claim 18, wherein the second speed of the mixing cycle comprises a constant speed.

* * * * *